Figure 1:
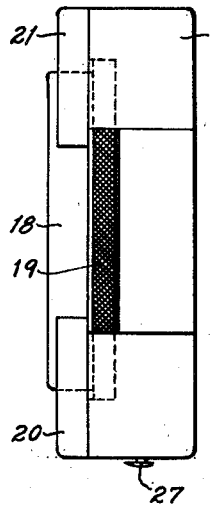

July 11, 1944.   G. KEINATH   2,353,163

EXPOSURE METER

Filed June 21, 1940

INVENTOR
George Keinath.
BY
Atty.

Patented July 11, 1944

2,353,163

UNITED STATES PATENT OFFICE 2,353,163

EXPOSURE METER

George Keinath, Larchmont, N. Y.

Application June 21, 1940, Serial No. 341,720

2 Claims. (Cl. 88—23)

My invention relates to exposure meters for determining the exposure time (shutter speed) of a photographic apparatus and/or the appertaining lens or diaphragm aperture (lens speed) in dependence upon the brightness or light intensity measured.

Such exposure meters contain a light-measuring instrument, usually comprising a photoelectric cell and a moving-coil instrument whose movable pointer indicates the mean value of the light intensity affecting the cell, the instrument being usually calibrated in candles per square foot. It is also known to provide such exposure meters with a calculating device for computing, from the measured light intensity and the sensitivity of the photographic emulsion (film speed), the corresponding values of the exposure time and lens aperture. According to known constructions of such exposure meters, the computing device, though mounted on the casing of the meter proper, is not cooperatively connected with the meter and thus represents but a separate slide-rule arrangement. It is also known to combine the computing device with the brightness scale of the light-measuring instrument, so that the instrument scale proper and the scales of the computing device form a cooperative unit.

The present invention relates, more particularly, to the last-mentioned type of computing exposure meters, and aims at further improvements of such type meters.

The calculation to be performed by such computing exposure meters has to take into account the following four determinants:

1. The exposure time (shutter speed),
2. The sensitivity of the photographic emulsion (film speed or sensitivity of the photographic paper),
3. The relative aperture of the objective lens (lens speed, diaphragm aperture, or focal stop), and
4. The mean brightness of the object (light intensity).

Each of these four determinants is variable. The exposure time may amount to from several hours and minutes to $\frac{1}{2000}$ of a second; the sensitivity of the photographic emulsion may vary in a proportion of 1:3000; the lens aperture may lie between F:1 and F:32, which also represents a variation in a proportion of about 1:1000; and finally, the brightness may vary between 0.1 and 3000 candles per square foot, representing a variation of exposure time in a proportion of about 1:30000. In exceptional cases, the variations may cover even greater proportions than here exemplified.

In exposure meters for the particular use with moving-picture cameras, the exposure time is indicated by the number of frames per second. For instance, an exposure time of $\frac{1}{32}$ of a second corresponds to about 16 frames per second for the plurality of movie cameras.

The foregoing shows that the users of an exposure meter have a number of scales and a multitude of scale indicia to deal with. One of the known exposure meters, for instance, has four different scales arranged on its reading surface and to be observed by the user. These four scales include: 45 shutter speeds; 30 emulsion sensitivities; 30 lens speeds; 30 light intensities.

The observing of four different scales of indicia, all appearing in the field of vision when using the meter, and the crowding together of numerous indicia put rather exacting demands on the attention of the user and affect the accuracy of the indication because of the relatively small space available for the individual scales and indicia. The known exposure meters of the computing type are further of such a construction that the indication effected by the pointer is not used directly but serves only as a determinant for a subsequent calculation to be effected with the associated slide-rule arrangement.

It is an object of my invention to eliminate the just-mentioned drawbacks of the known computing exposure meters.

An object, more specifically, is to simplify the mode of operation of computing exposure meters by reducing the number of scales and indicia appearing in the field of vision when employing the meter, without foregoing any advantage of the known constructions.

Another object of the invention is to provide a computing exposure meter which operates as a directly indicating instrument, so that the magnitude to be determined is indicated by the movable pointer of the instrument.

An object also is to facilitate the reading-off of the magnitude indicated by the exposure meter.

In order to accomplish these objects, as well as other objects which will become apparent from the following description, the present invention in one of its aspects consists in a computing exposure meter whose scales of indicia are so arranged that the scales of the shutter speeds and lens speeds appear in the field of vision when observing the indication of the pointer, while the film speed scale lies outside of this field of vision.

According to the invention, more particularly, the scale of indicia, representing the emulsion sensitivity (film speed), is disposed at one of the surfaces of the exposure meter which run perpendicularly to the main reading surface.

According to another feature of the present invention, the main scale or field of markings, directly cooperating with the movable pointer of the exposure meter, is movable or adjustable relative to the stationary body or casing of the device, and the movement or adjustment of this main scale is effected by the computing device. As a result, a directly indicating instrument is obtained which allows effecting all necessary computing adjustments before the meter is actually aimed at the object.

The foregoing and other features of the invention will be more readily understood from the following description of the embodiment illustrated in the drawing.

Figure 2:
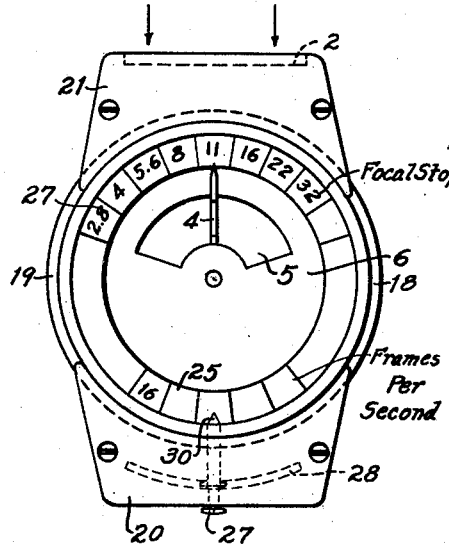
Figure 3:
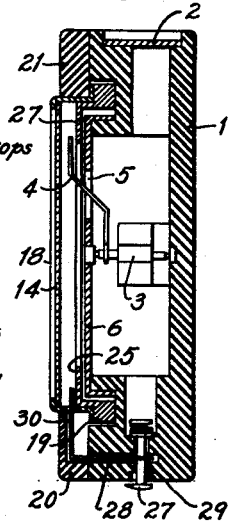
Figure 4:
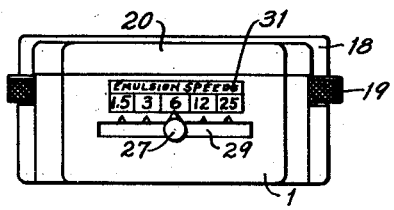

Fig. 1 is a side elevation, Fig. 2 a front view, Fig. 3 a longitudinal cross section and Fig. 4 a front view of the instrument.

Referring to the drawing, the casing 1 of the exposure meter, consisting preferably of insulating material, is provided with a photo-cell 2 and a moving-coil instrument 3 operated by the electric current generated in the cell. These elements of the device, as well as other interconnecting and auxiliary parts, are known and do not belong to the invention proper and therefore not illustrated in detail. The pointer, operated by the moving-coil instrument, is designated by 4. It passes through an opening 5 of a stationary plate 6 which is mounted on the casing 1.

A ring member 18, having a peripheral flange 19, is disposed concentrically to the stationary plate 6, and is rotatable, the flange 19 extending somewhat over the casing 1 and being knurled in order to facilitate revolving the ring by hand. This ring member is provided with a glass plate and is held in place by covers 20 and 21 which are secured to the casing 1. The annular front surface of the ring member 18 is provided with two scales of indicia. The first scale, designated by 27, cooperates with the pointer and represents the apertures or focal stops. The second scale, designated by 25, indicates the exposure time or the frames per second. Another pointer or mark 30 is movable in a slot 28. A knob 27, arranged at the end surface of the casing 1 opposite the photo-cell 2, serves to place the mark 30 in proper position. The knob 27 is movable in a slot 29 and has a pointer or mark cooperating with a scale of indicia 31 which represents the sensitivity of the photographic emulsion (film speeds). The slot 29 is provided with notches, or the like, which secure the knob 27 in the selected position.

The instrument is operated in the following manner. The knob 27 is adjusted so as to point at the emulsion sensitivity of the photographic material to be used. Then the scale 25 is adjusted by rotating the flange 19 so that the mark 30 points at the frames per second intended to be operated with when using the moving-picture camera. After these adjustments have been made, the exposure meter is prepared for a direct indication of the focal stop to be used. The meter is aimed at the object so that the light coming from the object falls upon the light element 22 in the direction of the arrows shown in Fig. 2. The pointer 4 now shows directly the stop to be used.

Of course, it is also possible to indicate on scale 25 the shutter speed instead of the frames per second. A further modification is obtained if the two speed scales 25 and 27 are exchanged so that the aperture or focal stop intended to be used is placed below mark 30. The pointer 4 then directly indicates the shutter speed or frames per second necessary for an accurate exposure. The ring member 18 and the scales 25 and 27 may be arranged so that by rotating the ring about 180°, the exposure meter is adjusted to have the pointer 4 selectively indicate either the aperture, or the shutter speed or frames per second.

As will be seen from the foregoing description of the directly indicating exposure meter, the computing device cooperating with the pointer of the instrument is so designed that the necessary adjustments for taking into account the sensitivity of the emulsion and one of the two other speed magnitudes (either shutter speed or lens speed) may be made in advance so that no further adjustment is necessary when the exposure meter is aimed at the object to be photographed. Thus the reading of the apparatus is facilitated and no additional time is necessary between the reading of the pointer indication and the operation of the photographic apparatus. As in the aforedescribed embodiments, the scale of the film sensitivities is outside the field of vision when using the apparatus, so that the scale arrangement at the reading surface proper of the instrument is simple, and sufficient space is available for the two scales of the lens speeds and shutter speeds.

The sensitivity of emulsion of film speed may be indicated in any units, i. e. in Scheiner degrees or in Weston degrees, or scales showing both units side by side may be employed.

I claim:

1. A photographic exposure meter for determining one of the magnitudes of shutter speed and lens speed relative to the other in dependence upon the brightness of the object and the sensitivity of the photographic emulsion, comprising a light-measuring instrument having a casing, a moving pointer responsive to the brightness of the object, a ring member arranged at the front surface of said casing and rotatable relative to said casing, a scale of indicia representing said speed magnitude to be determined, said scale being arranged on said ring member in direct cooperative relationship to said pointer and being adjustable by rotating said ring member so as to vary the indication effected by said pointer, a second scale of indicia also provided on said ring member and representing said other speed magnitude, a displaceable marker arranged at the front surface of said casing to cooperate with said second scale, a third scale of indicia representing the emulsion sensitivity arranged at a lateral surface of said casing, and an adjusting member having pointer means cooperating with said third scale and connected with said marker so that said marker is displaced in accordance with the adjustment of said adjusting member and pointer means.

2. A photographic exposure meter for determining one of the magnitudes of shutter speed and lens speed relative to the other in dependence upon the brightness of the object and the sensitivity of the photographic emulsion, comprising a light-measuring instrument having a casing, a moving pointer responsive to the brightness of the object, a ring member arranged at the front surface of said casing and rotatable relative to said casing, a scale of indicia representing said speed magnitude to be determined, said scale being arranged on said ring member in direct cooperative relationship to said pointer and being adjustable by rotating said ring member so as to vary the indication effected by said pointer, a second scale of indicia also provided on said ring member and representing said other speed magnitude, a displaceable marker to cooperate with said second scale, a third scale of indicia representing the emulsion sensitivity arranged on said casing, and an adjusting member having pointer means cooperating with said third scale and connected with said marker so that said marker is displaced in accordance with the adjustment of said adjusting member and pointer means.

GEORGE KEINATH.